(12) United States Patent
Wolf et al.

(10) Patent No.: US 9,885,228 B2
(45) Date of Patent: Feb. 6, 2018

(54) APPARATUS, SYSTEMS, AND METHODS FOR DOWNHOLE FLUID FILTRATION

(71) Applicant: National Oilwell Varco, L.P., Houston, TX (US)

(72) Inventors: Mark E. Wolf, Katy, TX (US); Robert Eugene Mebane, III, Austin, TX (US)

(73) Assignee: NATIONAL OIL WELL VARCO, L.P., Houston, TX (US)

( * ) Notice: Subject to any disclaimer, the term of this patent is extended or adjusted under 35 U.S.C. 154(b) by 421 days.

(21) Appl. No.: 14/566,420

(22) Filed: Dec. 10, 2014

(65) Prior Publication Data

US 2015/0159472 A1 Jun. 11, 2015

Related U.S. Application Data

(60) Provisional application No. 61/914,225, filed on Dec. 10, 2013, provisional application No. 62/055,035, filed on Sep. 25, 2014.

(51) Int. Cl.

| | |
|---|---|
| *E21B 43/38* | (2006.01) |
| *E21B 43/12* | (2006.01) |
| *E21B 43/08* | (2006.01) |
| *E21B 43/20* | (2006.01) |
| *C02F 1/44* | (2006.01) |
| *B01D 61/02* | (2006.01) |

(52) U.S. Cl.
CPC ............ *E21B 43/08* (2013.01); *B01D 61/025* (2013.01); *C02F 1/441* (2013.01); *E21B 43/126* (2013.01); *E21B 43/128* (2013.01); *E21B 43/20* (2013.01); *E21B 43/385* (2013.01)

(58) Field of Classification Search
CPC ........ E21B 43/385; E21B 43/08; E21B 43/20; E21B 43/126; E21B 43/128; E21B 43/34–43/40; C02F 1/441; E03B 3/06–3/26; B01D 61/025
USPC .......................................... 166/313, 66.4, 68
See application file for complete search history.

(56) References Cited

U.S. PATENT DOCUMENTS

| | | | |
|---|---|---|---|
| 4,241,787 A | 12/1980 | Price | |
| 5,082,053 A * | 1/1992 | Bernhardt | ................. B09C 1/02 |
| | | | 166/106 |
| 5,988,275 A * | 11/1999 | Brady | ................... E21B 43/385 |
| | | | 166/105.5 |
| 7,600,567 B2 | 10/2009 | Christopher et al. | |

(Continued)

FOREIGN PATENT DOCUMENTS

| | | |
|---|---|---|
| GB | 2248462 A | 4/1992 |
| WO | 2005/068371 A1 | 7/2005 |

OTHER PUBLICATIONS

Brochure entitled "Water-Well Drilling: The Future of Drinking Water," GeoDrilling International, Nov. 2013, www.geodrillinginternational.com (2 p.).

(Continued)

*Primary Examiner* — George Gray
(74) *Attorney, Agent, or Firm* — Conley Rose, P.C.

(57) ABSTRACT

A fluid production system for downhole fluid purification includes a filtering assembly to be positioned within a wellbore. The filtering assembly has a fluid filter and a first pump closely-coupled to the filter. In addition, the system includes an extension shaft extending from the first pump to a source of rotational power positioned adjacent the surface of the earth.

19 Claims, 4 Drawing Sheets

(56) References Cited

U.S. PATENT DOCUMENTS

2003/0230535 A1    12/2003    Affeld et al.
2006/0261009 A1    11/2006    Jacks et al.
2007/0151915 A1     7/2007    Barber

OTHER PUBLICATIONS

Water Desalination Report, vol. 50, No. 34, Sep. 15, 2014 (4 p.).
Article entitled "KWR's First Operational Freshmaker Stores Fresh Water in the Ground, Replacing Salt Water," Jul. 23, 2013, http://www.dutchwatersector.com/news-events/news/6704-kwr-s-first-operational-freshmaker-stores-fresh-water-in-the-ground-replacing-salt-water.html (4 p.).
Article entitled "The Freshmaker Replaces Salt Water with Fresh Water," Jul. 27, 2013, http://www.kwrwater.nl/Freshmaker_replaces_salt_water_with_fresh_water/ (3 p.).
Brochure entitled "Watershare: Fresh Keeper from Watershare," Jul. 1, 2014 (2 p.).
"Desalination Products and Services—In Situ Groundwater Desalination—Desaln8," http://www.desaln8.com/services.php, Aug. 3, 2015 (1 p.).
PCT/US2014/069582 International Search Report and Written Opinion dated Jun. 3, 2015 (15 p.).
Burnett, David B., et al. ,"Decision and Risk Analysis Study of the Injection of Desalination By-Products into Oil and Gas-Producing Zones," SPE International Symposium and Exhibition on Formation Damage Control, Lafayette, Louisiana, U.S.A., Feb. 18-20, 2004, SPE 86526 (14 p.).

* cited by examiner

APPARATUS, SYSTEMS, AND METHODS FOR DOWNHOLE FLUID FILTRATION

CROSS-REFERENCE TO RELATED APPLICATIONS

This application claims benefit of U.S. provisional patent application Ser. No. 61/914,225 filed Dec. 10, 2013, and entitled "Apparatus, Systems, and Methods for Downhole Fluid Filtration," which is hereby incorporated herein by reference in its entirety for all purposes. This application also claims benefit of U.S. provisional patent application Ser. No. 62/055,035 filed Sep. 25, 2014, and entitled "Apparatus, Systems, and Methods for Downhole Fluid Filtration," which is hereby incorporated herein by reference in its entirety for all purposes.

STATEMENT REGARDING FEDERALLY SPONSORED RESEARCH OR DEVELOPMENT

Not applicable.

BACKGROUND

This disclosure relates generally to improving the purity of water. More particularly, it relates to an apparatus and system for the purification of or desalination of water from underground. Still more particularly, this disclosure relates to a filtration apparatus and system that may be used to recover and purify water from a borehole in the earth.

Various types of filters can be employed to improve the quality of water taken from zones within the earth by removing suspended or dissolved substances from the water. For example, reverse osmosis (RO) membrane technology, is used to remove salt from brackish and saline water sources to produce fresh, purified water. The RO process requires high pressure pumping which consumes significant levels of energy. The RO process concentrates the salts from the feed water source into a more-concentrated stream that requires disposal. In a typical system, the pressure of saline/brackish feed water is boosted through a high pressure pump and delivered to a filter having an RO membrane. The pump increases the feed water pressure such that the forward pressure across the RO membrane exceeds the natural reverse osmotic pressure across the membrane. The reverse osmotic pressure is caused by the difference in salt concentration between a saline water on one side of the RO membrane and fresh water on the other side of the RO membrane. The reverse osmotic pressure acts to compel fresh water to go (or return) to the feed water side. However, when a pump is used to pressurize and feed the saline water to the membrane, the elevated pressure from the pump causes water molecules to pass through the membrane in opposition to reverse osmotic pressure and to arrive as permeate on the low pressure, fresh water side of the membrane. In this process salt molecules are retained on the high pressure side of the membrane along with a portion of the feed water, developing a concentrated reject stream that exits a concentrated fluid outlet of the filter. A pressure control device, such as a back-pressure regulator or back-pressure regulating valve, is coupled to the concentrated fluid outlet of the filter to allow the pump to develop pressure and to govern, or at least to influence, the flow rate from the concentrated fluid outlet. In this manner, the back-pressure regulator influences the recovery ratio, which is the ratio of the rate of recovery of permeate or purified water from the filter to the rate of supply of feed water to the filter.

For an oil well producing hydrocarbons, enhanced oil recovery can be achieved in some instances by injecting water into a second well or borehole generally near the producing oil well. The water is injected into the production zone or a zone that fluidically communicates with the production zone to increase the pore pressure in the production zone and cause an increased flow of hydrocarbons into the oil well.

BRIEF SUMMARY OF THE DISCLOSURE

These and other needs in the art are addressed in one embodiment by a fluid production system for downhole fluid purification. In an embodiment, the system includes a filtering assembly configured to be disposed within a wellbore and having: a filter comprising a fluid inlet, a permeate outlet, and a concentrated fluid outlet; and having a first pump closely-coupled to the filter for fluid communication. The first pump includes a suction port and a discharge port. In addition, the system includes an extension shaft extending from the first pump to a source of rotational power disposed adjacent the surface of the earth.

In addition a method for reducing the amount of dissolved constituents contained in a fluid is disclosed. In an embodiment, the method includes (a) having a filtering assembly disposed in a first wellbore; wherein the filtering assembly comprises a membrane filter, a first pump closely-coupled to a first port of the filter, and a second pump closely-coupled to a concentrated fluid outlet of the filter. In addition, the method includes operating the first pump to move a fluid from a fluid supply zone of the earth through the filtering assembly to remove unwanted constituents, producing a purified permeate stream. Further, the method includes producing a concentrated fluid stream that exits the filtering assembly. Still further, the method includes operating the second pump to achieve a constant ratio between the flow rate of the permeate stream and the concentrated fluid stream, and disposing of the concentrated fluid stream in a selected discharge zone within the earth.

In an embodiment, a fluid production system to desalinate water from a subterranean source includes a filtering assembly configured for installation within a first wellbore. The filtering assembly includes a membrane filter comprising a fluid inlet, a permeate outlet, and a concentrated fluid outlet. In addition, the filtering assembly includes a first pump having a discharge port and a suction port, the suction port coupled to the permeate outlet for fluid communication; and a second pump having a suction port coupled to the concentrated fluid outlet for fluid communication.

Thus, embodiments described herein include a combination of features and characteristics intended to address various shortcomings associated with certain prior devices, systems, and methods. The various features and characteristics described above, as well as others, will be readily apparent to those of ordinary skill in the art upon reading the following detailed description, and by referring to the accompanying drawings.

BRIEF DESCRIPTION OF THE DRAWINGS

For a detailed description of the disclosed embodiments, reference will now be made to the accompanying drawings in which.

NOTATION AND NOMENCLATURE

Figure 1:
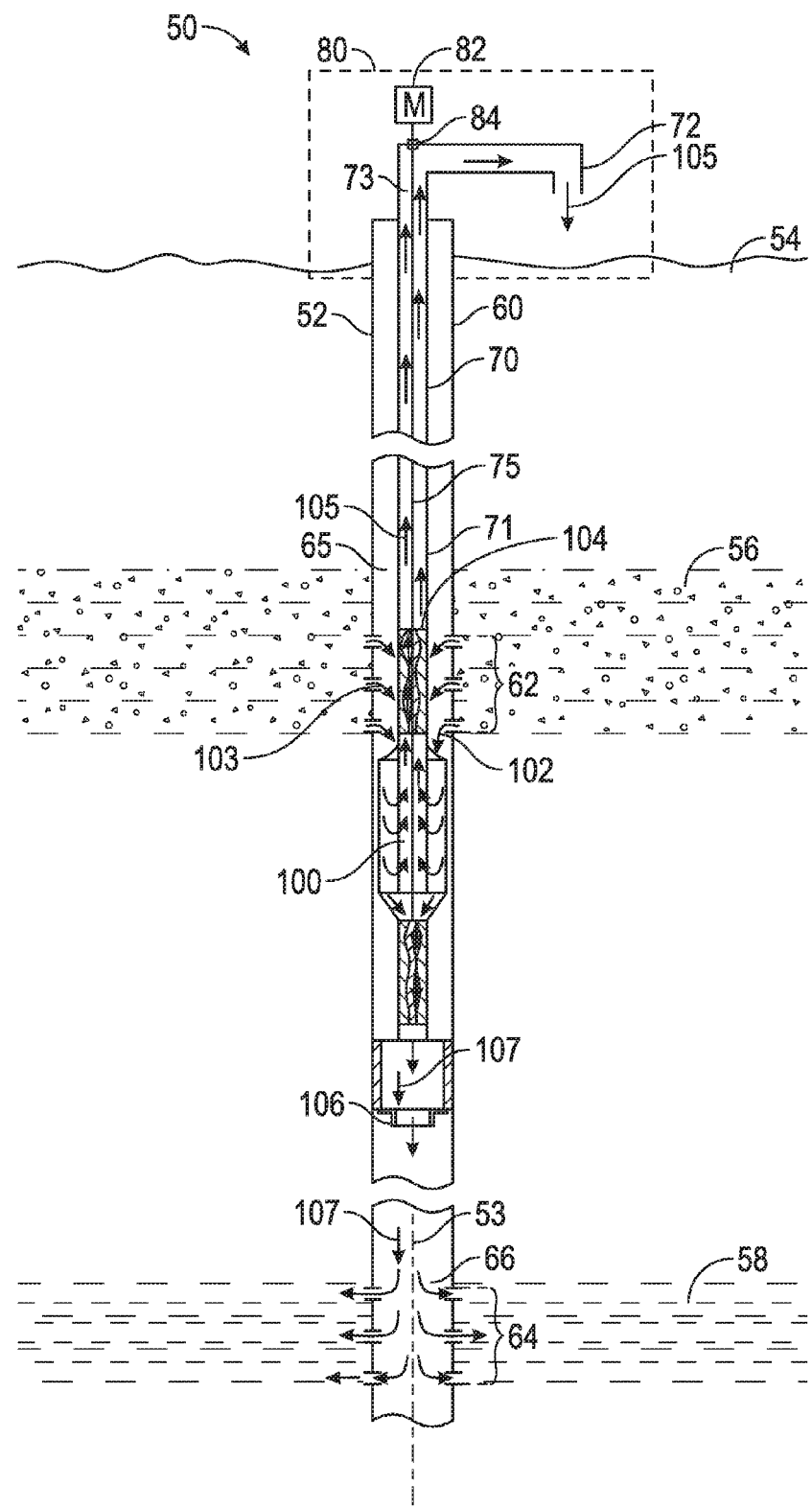
FIG. 1 is a front view in partial cross-section of an embodiment of a fluid production system having a filtering or desalination assembly disposed in a wellbore and capable of reducing the saline content of water in accordance with principles described herein.

The following description is exemplary of certain embodiments of the disclosure. One of ordinary skill in the art will understand that the following description has broad application, and the discussion of any embodiment is meant to be exemplary of that embodiment, and is not intended to suggest in any way that the scope of the disclosure, including the claims, is limited to that embodiment.

The drawing figures are not necessarily to scale. Certain features and components disclosed herein may be shown exaggerated in scale or in somewhat schematic form, and some details of conventional elements may not be shown in the interest of clarity and conciseness. In some of the figures, in order to improve clarity and conciseness of the figure, one or more components or aspects of a component may be omitted or may not have reference numerals identifying the features or components that are identified elsewhere. In addition, within the specification, including the drawings, like or identical reference numerals may be used to identify common or similar elements.

The terms "including" and "comprising" are used herein, including in the claims, in an open-ended fashion, and thus should be interpreted to mean "including, but not limited to . . . ." Also, the term "couple" or "couples" means either an indirect or direct connection. Thus, if a first component couples or is coupled to a second component, the connection between the components may be through a direct engagement of the two components, or through an indirect connection that is accomplished via other intermediate components, devices and/or connections. The recitation "based on" means "based at least in part on." Therefore, if X is based on Y, X may be based on Y and any number of other factors.

In addition, as used herein, including the claims, the terms "axial" and "axially" generally mean along or parallel to a given axis, while the terms "radial" and "radially" generally mean perpendicular to the axis. For instance, an axial distance refers to a distance measured along or parallel to a given axis, and a radial distance means a distance measured perpendicular to the axis.

Furthermore, any reference to a relative direction or relative position in the description and the claims will be made for purpose of clarification, with examples including "top," "bottom," "up," "upward," "left," "leftward," "down," "lower," "clock-wise," and the like. For example, a relative direction or a relative position of an object or feature pertains to the orientation as shown in a figure or as described. If the object were viewed from another orientation, it may be appropriate to describe the direction or position using an alternate term. In regard to a borehole or a wellbore, "up," "upper," "upwardly" or "upstream" mean toward the surface of the borehole and "down," "lower," "downwardly," or "downstream" mean toward the terminal end of the wellbore, regardless of the wellbore orientation.

As used herein, including the claims, the terms pure, purification, purify, and similar terms shall refer to the removal of a portion or the entirety of at least one unwanted constituent from a source fluid to produce a product fluid having less of the constituent. In some situations, the unwanted constituent is present or detectable within a "purified" product fluid; while in other situations, the unwanted constituent is absent or undetectable in a "purified" product fluid. The unwanted constituent may be, for example, dissolved salt or undissolved particles. The purified product fluid may have another unwanted constituent that is present in the same concentration as it is in the source fluid.

As used herein, including the claims, the term "closely-coupled" is used to indicate that two features are coupled together and are disposed within 50 feet of one another. Within the scope of this disclosure, at least some of the pairs of features that are described herein as being closely-coupled will have, for some embodiments, one of the following relationships: the two features overlap each other, the two features abut or touch each other; the two features are adjacent each other; or the two features are directly attached to each other—since these relationships exist within a distance of 50 feet.

DETAILED DESCRIPTION OF THE DISCLOSED EMBODIMENTS

Herein are disclosed various embodiments of a fluid production system configured for purifying a fluid, for example, brackish water from a wellbore in the earth. In an embodiment, the fluid production system includes a filtering or desalination assembly having membrane filtration technology configured to be positioned downhole in fluid communication with a fluid supply zone and having a fluid inlet, a permeate outlet, and a concentrated fluid outlet. In some embodiments, the desalination assembly also includes two pumps. One of the pumps is coupled to the permeate outlet to drive purified or processed water to an intended location, such as up and out of the well or to a storage zone in the earth. The other pump is coupled to the concentrated fluid outlet to drive the concentrated fluid to a discharge fluid zone in the earth. In an embodiment, the two pumps are configured to maintain a constant pumping ratio relative to one another. In some embodiments, the pumping ratio is adjustable, being constant for a selectable period of time or a selectable set of circumstances. Some embodiments of a fluid production system disclosed herein are installed in a first borehole adjacent a second borehole and participate in enhanced oil recovery.

Referring to FIG. 1, a fluid production system 50 that removes unwanted constituents from an available fluid is shown. The fluid production system 50 is positioned in a borehole or wellbore 52 extending from the surface of earth 54 downward to the vicinity of a fluid supply zone 56, which may be a source of feed water, and toward a fluid discharge zone 58. Fluid production system 50 is capable of reducing the mineral content, e.g. reducing the salinity, of water received from supply zone 56. The water received from supply zone 56 will be called feed stream or feed water 103, and may be characterized as saline water, brackish water, contaminated water, impure water, or non-potable water, any of these potentially having an unwanted constituent that may be dissolved, suspended, or otherwise entrained in the feed water 103. Thus, in FIG. 1, fluid production system 50 is configured or disposed to receive subterranean water as the feed stream 103 and may also be called a water production system. Wellbore 52 includes a longitudinal axis 53 generally aligned with the center of wellbore 53 through the length of wellbore 53. Though shown as vertical, in general, wellbore 52 and wellbore axis 53 may have generally vertical portions or generally horizontal portions and may have curved portions between various portions. At least in this instance, discharge zone 58 is located at a lower elevation than supply zone 56. A tubular casing 60, which may be a metal pipe for example, is positioned and cemented in wellbore 52. Casing 60 has a first set of perforations 62 at a location corresponding to supply zone 56 and a second set of perforations 64 at a location corresponding to discharge zone 58. Perforations 62, 64 provide fluid communication between the central channel of casing 60 and zones 56, 58, respectively.

Water production system 50 includes a production tubing 70, an extension shaft 75 extending from outside wellbore 52 into production tubing 70, surface equipment 80 disposed above or adjacent the surface of the earth 54, and a filtering assembly, which in this embodiment is a desalting or desalination assembly 100. Desalination assembly 100 is sealingly coupled to the lower ends of production tubing 70 and extension shaft 75 and is positioned within casing 60 and wellbore 52 at a selected depth below the earth's surface. Production tubing 70 includes a lower end 71 within casing 60 and wellbore 52, an upper end 73 that may extend above the earth's surface. Upper end 73 terminates at a permeate discharge port 72. Discharge port 72 is routed to a convenient location to release a stream 105 of processed or cleaned water, which will also be called the permeate stream 105. Surface equipment 80 includes a source of rotational power, which is motor 82, shaft bearing 84, and other equipment known in the art. Shaft 75 may also be called a rod string and is coupled between desalination assembly 100 and motor 82 to transmit rotational power. In FIG. 1, motor 82 is positioned outside the production tubing 70 and outside the wellbore 52, and the fluid-tight shaft bearing 84 allows shaft 75 to extend into production tubing 70 without loss of fluid. In FIG. 1, the upper portion of production tubing 70 including permeate discharge port 72 may be considered a part of the surface equipment 80.

The filtering assembly, i.e. desalination assembly 100, includes three fluid ports: an annular feed water inlet 102 located towards the upper end of assembly 100, a processed water outlet or permeate outlet 104 located at the upper end of assembly 100, and concentrated fluid outlet 106 located at the lower end of assembly 100. Water production system 50 is configured to take feed water 103 coming from supply zone 56, to purify a portion of the feed water 103 as processed water or permeate 105, to deliver the processed permeate above the surface of the earth, and to deliver a concentrated fluid stream 107 to discharge zone 58. Within casing 60, desalination assembly 100 isolates the feed water 103 from the concentrated fluid stream 107.

In some embodiments, wellbore 52 and casing 60 are considered to be elements of water production system 50. In some instances or some embodiments, casing 60 or cement is absent from at least a portion of wellbore 52. For example, in some instances, a water production system 50 is installed for operation in a wellbore having no casing and no cement in the vicinity of the water production system, the fluid supply zone, or the discharge zone.

Figure 2:
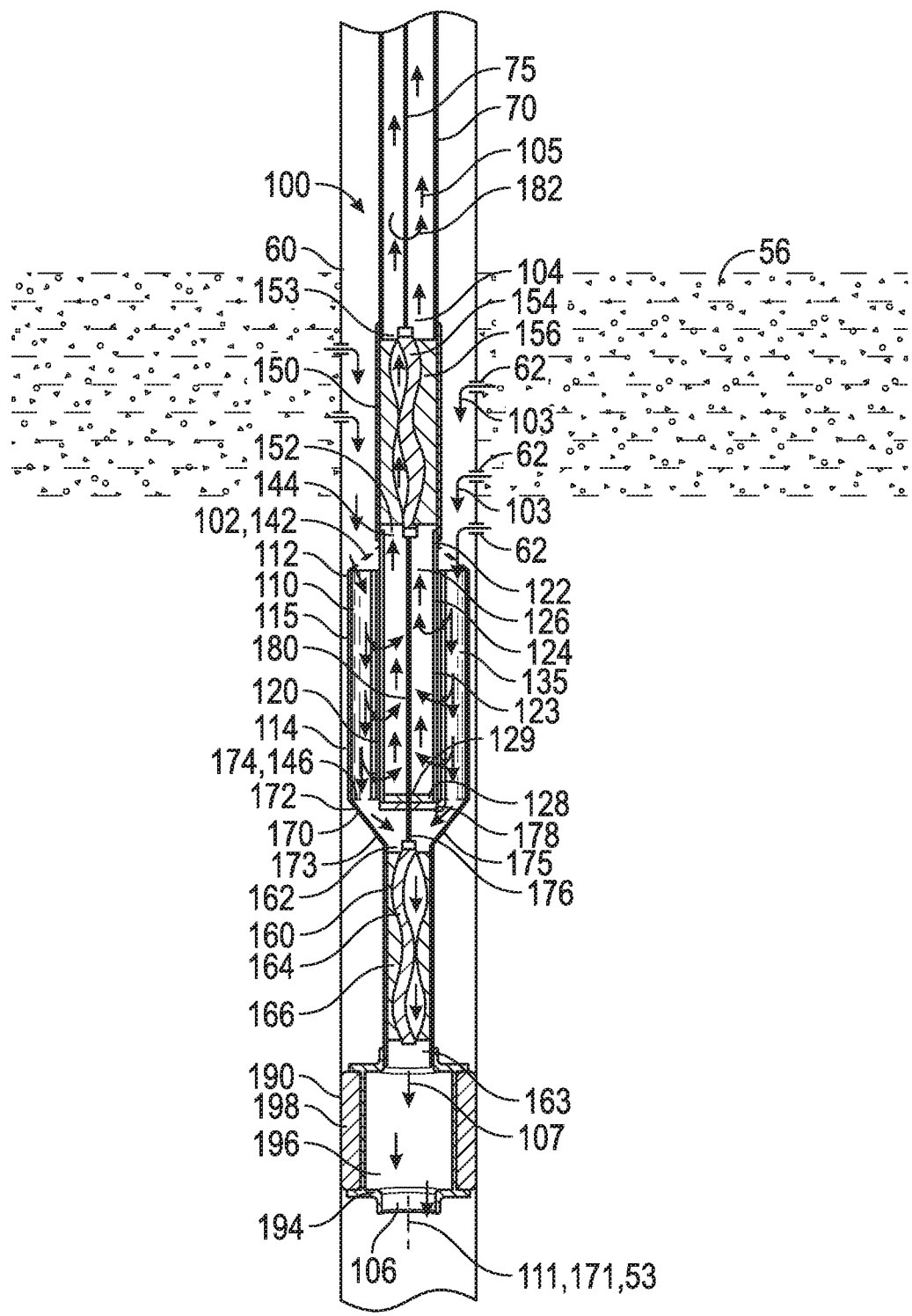
FIG. 2 is a cross-sectional front view of the filtering or desalination assembly of FIG. 1 in accordance with principles described herein.

Referring now to FIG. 2, the desalination assembly 100 includes a filter 110, two pumps 150, 160 closely-coupled to ports at either end of filter 110 for fluid communication, a discharge coupler 170 disposed between filter 110 and the pump 160, an interconnecting shaft 180 extending through the center of filter 110 to pumps 150, 160, and a packing member 190 to separate and seal two fluid zones within wellbore 52 or casing 60 and to stabilize the position of assembly 100. A fluid supply zone 65 within wellbore 52 or casing 60 is disposed above packing member 190 and may be in fluid communication with supply zone 56 and may be designated as being part of supply zone 56. A fluid discharge zone 66 within wellbore 52 or casing 60 is disposed below packing member 190 and is in fluid communication with discharge zone 58 and may be designated as part of zone 58.

In this embodiment, filter 110 is membrane filter unit, having a membrane 135 through which a purified portion of a feed stream may pass. Overall, filter 110 is elongated and generally cylindrical. More specifically, for this embodiment, membrane 135 is a spiral wound reverse osmosis (RO) membrane. Thus, filter 110 in FIG. 1 may also be called a reverse osmosis filter. Some embodiments of desalination assembly 100 include additional one or more different filters or filtration elements fluidically coupled in series with filter 110.

Interconnecting shaft 180 couples the drive shafts of pumps 150, 160 for simultaneous rotation, and extension shaft 75 couples the drive shafts of the two pumps to a source of rotational power, which is shown as a single source and that being motor 82 (FIG. 1). In this embodiment, the pumps 150, 160 are positive displacement pumps, and are, more specifically, progressive cavity pumps. Pumps 150, 160 are configured to rotate in the same direction 182 and at the same operation speed by means of interconnecting shaft 180 but configured to pump fluid in opposite directions from filter 110. The direction of rotation 182 may be selected and established to be clockwise or counter-clockwise, as viewed from the earth's surface, depending on the design of pumps 150, 160. In some embodiments, pumps 150, 160 are reciprocating pumps or another suitable type of positive displacement pump, which may include, for example, a gear pump or a rotary lobe pump. Being positive displacement pumps, each pump 150, 160 has a prescribed discharge-volume-per-cycle characteristic. Because pumps 150, 160 are positive displacement pumps and are coupled by an interconnecting shaft 180, pumps 150, 160 are configured to operate with constant pumping ratio and, more specifically, a fixed pumping ratio. "Fixed pumping ratio" means that the ratio of the permeate stream 105 flow rate to the concentrated fluid stream 107 flow rate is prescribed by the arrangement of the equipment to be constant and unchanging unless the arrangement of the equipment is changed, e.g. a pump 150, 160 is swapped for another pump. Therefore, during normal operation, the percent of the feed water 103 passing through permeate pump 150 is constant, and the percent of the feed water 103 passing through concentrated fluid pump 160 is also constant. The percent of the feed water 103 passing through pump 160 as concentrated fluid stream 107 is set or established to be sufficiently high to avoid contamination of the membrane 135.

In general, reverse osmosis filter 110 includes a generally centralized, longitudinal axis 111, a first or upper end 112, a second or lower end 114 opposite upper end 112 along axis 111, a tubular outer casing 115 extending axially between ends 112, 114, an inner tubing 120 also extending axially between ends 112, 114, the spiral-wound reverse osmosis membrane 135 disposed between inner tubing 120 and outer casing 115, and a plurality of fluid ports. RO membrane 135 may include, for example, two RO membrane sheets bonded together to form a first flow channel or an interconnected series of flow pathways between them. When wound in a spiral pattern, a second flow channel is created by the outer surfaces of the RO membrane sheets. Reverse osmosis filter 110 may be fabricated according to conventional designs or may be specially made for the particular application.

The inner tubing 120 of filter 110 is concentrically aligned with axis 111 and includes a first or upper end 122 at filter upper end 112, a second or lower end 123 at filter lower end 114, a permeable wall portion 124 located within outer casing 115 and surrounded by RO membrane 135, a central flow channel 126, and an end cap 128 sealingly coupled to lower end 123. A through-hole 129 aligned with axis 111 extends through end cap 128 and sealingly receives interconnecting shaft 180. In FIG. 2, upper end 122 of tubing 120 extends axially beyond the upper end of outer casing 115, and lower end 123 is generally flush with the lower end of outer casing 115.

The fluid ports of filter 110 include an annular feed water inlet screen 142 located between inner tubing 120 and outer casing 115 at the filter's upper end 112, a processed water or permeate outlet port 144 located at the upper end 122 of inner tubing 120, and an annular concentrated fluid outlet screen 146 located between inner tubing 120 and outer casing 115 at the filter's lower end 114. The filter's inlet screen 142 corresponds to feed water inlet 102 of desalination assembly 100.

Continuing to reference FIG. 2, permeate pump 150 includes an inlet or suction port 152 at the lower end of pump 150, a discharge port 153 at the upper end of pump 150, a rotor 154, and a stator 156. Suction port 152 closely-couples to upper end 122 of inner tubing 120 of filter 110, and discharge port 153 closely-couples to the lower end 71 of production tubing 70 for fluid communication therebetween. In the embodiment, pump suction port 152 attaches directly to filter 110, and discharge port 153 attaches directly to the tubing lower end 71, with these two direct couplings each enhanced by a sealing member (not shown). Pump 150 is configured to move fluid axially upward through production tubing 70 when pump 150 is rotated in the direction 182 by extension shaft 75, i.e. when rotor 154 is rotated in the direction 182 relative to stator 156.

Second progressive cavity pump 160 includes an inlet or suction port 162 at upper end of pump 160, a discharge port 163 at the lower end of pump 160, rotor 164, and a stator 166. Suction port 162 closely-couples to discharge coupler 170 and to outlet screen 146 of filter 110 for fluid communication. In the embodiment, pump suction port 162 attaches directly to discharge coupler 170, which may be considered a member of filter 110 to which it attaches. This direct attachment between suction port 162 and filter 110 is enhanced by a sealing member (not shown). Pump 160 is configured to move the concentrated fluid stream 107 axially downward toward discharge zone 58 when pump 160 is rotated in the direction 182 by interconnecting shaft 180, i.e. when rotor 164 is rotated in the direction 182 relative to stator 166. Thus, pumps 150, 160 rotate in the same direction 182. For this embodiment, the rotor and stator pair 164, 166 of the concentrated fluid pump 160 are configured to be a mirrored design of rotor and stator pair 154, 156 of the permeate pump 150. For example, if rotor and stator pair 154, 156 is designed as a right-handed pair, then the rotor and stator pair 164, 166 is designed as a left-handed pair to achieve opposite flow directions with respect to wellbore axis 53.

Discharge coupler 170 fixedly couples the pump 160 to filter 110, providing fluid communication therebetween. Discharge coupler 170 includes a first or upper end 172, a second or lower or discharge end 173, an annular inlet 174 at upper end 172, a frustoconical outer shell 175 extending between ends 172, 173, a coupler shaft 176 extending between ends 172, 173, and a rotary seal 178 at upper end 172. The described components of discharge coupler 170 are concentrically aligned along filter axis 111. Upper end 172 couples to lower end 114 of filter 110, sealing against outer casing 115. In this manner, annular inlet 174 is positioned adjacent the concentrated fluid outlet screen 146 for fluid communication. The lower end 173 of discharge coupler 170 couples and seals to concentrated fluid pump 160 at suction port 162. Rotary seal 178 is positioned at upper end 172 and seals against the end cap 128 of the RO filter inner tubing 120. Coupler shaft 176 couples to rotor 164 of pump 160 at lower end 173. Shaft 176 extends through and is sealed by rotary seal 178, coupling to interconnecting shaft 180 at lower end 114 of filter 110, as facilitated by the though-hole 129 in end cap 128. Rotary seal 178 allows shafts 176, 180 to rotate with respect to filter 110 and outer shell 175 of coupler 170 while inhibiting fluid communication between central flow channel 126 and the discharge coupler 170.

Packing member 190 includes an outer packing member 198 circumferentially surrounding a tubular body member 194 having an axially-extending flow passage 196. Outer packing member 198 is configured to stabilize the position of desalination assembly 100 against movement, i.e. against vertical translation, horizontal translation, rotation, or vibration, relative to wellbore 52 or casing 60. For this purpose outer packing member 198 extends radially between the outer circumference of body member 194 and the inner surface of wellbore casing 60. Packing member 190 is positioned between feed water inlet 102 and concentrated fluid outlet 106 to separate and seal fluid zones within wellbore casing 60. In the example of FIG. 2, the upper end of body member 194 is sealingly coupled to the discharge port 163 of pump 160.

Referring now to FIG. 1 and FIG. 2, the following is an exemplary mode of operation for water production system 50 and desalination assembly 100. During operation, feed water 103 from supply zone 56 enters wellbore casing 60 through the perforations 62, defining a feed water zone within wellbore casing 60 above packing member 190. The feed water 103 surrounds desalination assembly 100, communicates with feed water inlet 102, and is drawn into filter 110 and into RO membrane 135 by the action of pumps 150, 160. A first portion of the feed water 103 passes through the walls of RO membrane 135, becoming the permeate or processed water stream and leaving behind at least some salts or other constituents. The permeate stream 105 continues through the permeable wall portion 124 and into the central flow channel 126 of inner tubing 120. The permeate stream 105 is drawn from permeate outlet port 144 of filter 110 into pump 150 and is discharged from permeate outlet 104 into production tubing 70, being pushed toward the surface of the earth. A second portion of the feed water 103 continues through flow channels of membrane 135 without passing through the walls of membrane 135. The second portion carries along the salts or other constituents remaining from the now-separated permeate stream 105. Therefore, this second portion of feed water 103 becomes the concentrated fluid stream 107, which may also be called the reject stream. The concentrated fluid stream 107 exits filter 110 through the outlet screen 146, enters discharge coupler 170, and is further drawn into lower pump 160. Pump 160 discharges the concentrated fluid stream 107 through packing member 190 and through concentrated fluid outlet 106 at the bottom of member 190, which is the bottom of desalination assembly 100 in this embodiment. Packing member 190 separates the feed water zone located above member 190 from a concentrated fluid zone located below member 190 within wellbore casing 60. After passing outlet 106, the concentrated fluid stream 107 travels down through casing 60, exits through perforations 64, and enters discharge zone 58 within the earth.

Referring still to FIG. 1, in at least one mode of operation, desalination assembly 100 of water production system 50 is driven only by mechanical energy supplied by motor 82 via extension shaft 75. In a simple embodiment, desalination assembly 100 receives no other energy from surface equipment 80 and does not purposefully communicate information signals with surface equipment 80. Some other embodiments of assembly 100 include instrumentation or control equipment that exchange power or data signals with surface equipment 80. The instrumentation may include, for example, pressure transducers, pH meters, temperature sensing elements, flow meters, water quality sensors, or pump operational sensors.

Figure 3:
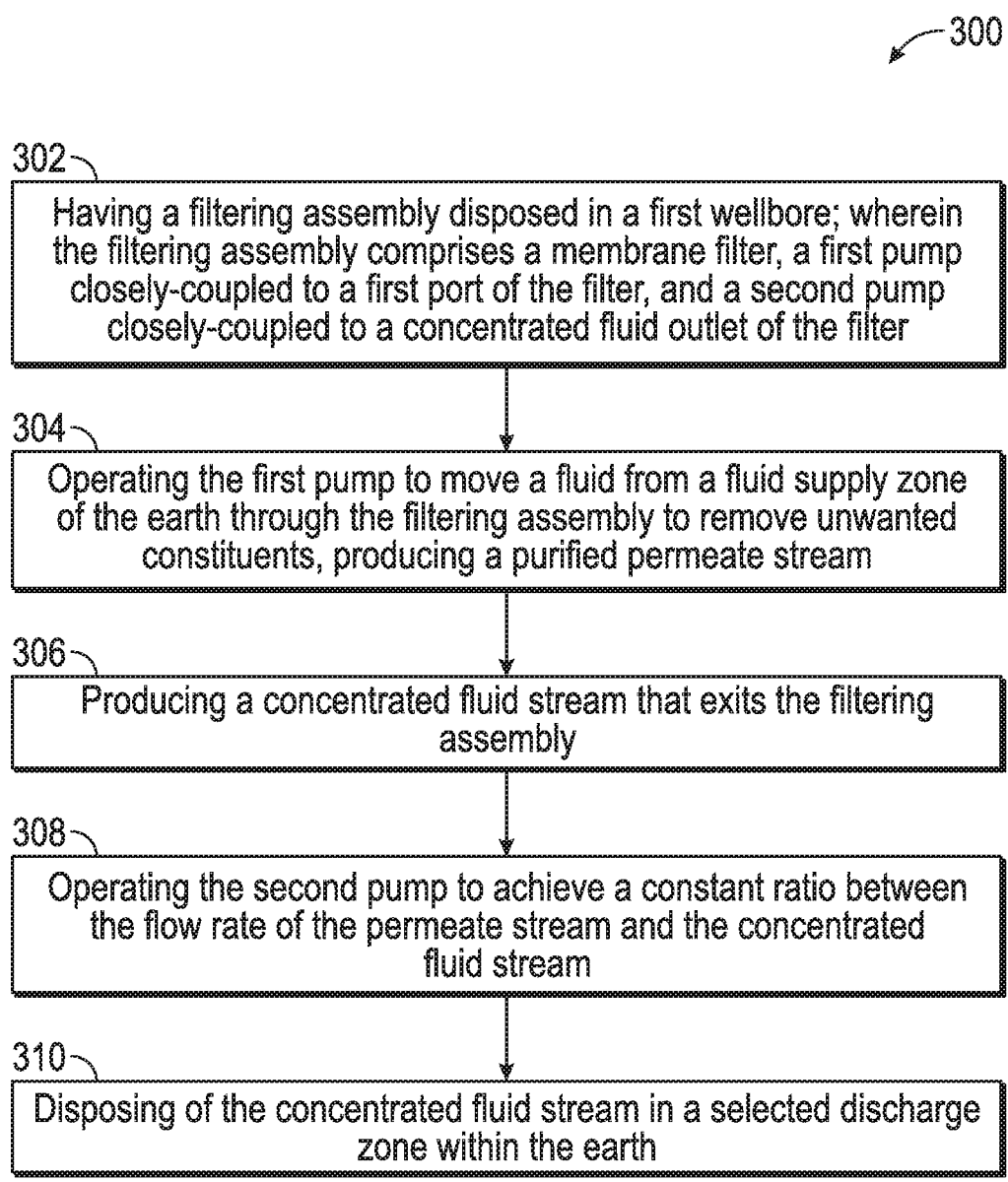
FIG. 3 is a flow diagram showing a method for reducing the amount of dissolved constituents contained in a fluid in accordance with principles disclosed herein.

FIG. 3 shows a method 300 for reducing the amount of dissolved constituents contained in a fluid in accordance with the principles described herein. At block 302, method 300 includes having a filtering assembly disposed in a first wellbore. The filtering assembly comprises a membrane filter, a first pump closely-coupled to a first port of the filter for fluid communication, and a second pump closely-coupled to a concentrated fluid outlet of the filter for fluid communication. Block 304 includes operating the first pump to move a fluid from a fluid supply zone of the earth through the filtering assembly to remove unwanted constituents, producing a purified permeate stream. Block 306 includes producing a concentrated fluid stream that exits the filtering assembly. Block 308 includes operating the second pump to achieve a constant ratio between the flow rate of the permeate stream and the concentrated fluid stream. Block 310 includes disposing of the concentrated fluid stream in a selected discharge zone within the earth. Some embodiments of method 300 include delivering at least a portion of the permeate stream to a selected permeable storage zone in the earth. Various embodiments of method 300 may include additional operations based on any of the concepts presented in this specification, including the figures.

In at least some implementations of method 300 the filter is a reverse osmosis (RO) filter capable of reducing the salinity of a fluid stream, the RO filter including a filter inlet port, a permeate outlet port for water of reduced salinity, and a concentrated fluid outlet port. The permeate pump includes a pump inlet sealingly coupled to the permeate outlet, and the concentrated fluid pump includes a pump inlet IS sealingly coupled to the concentrated fluid outlet. In at least some implementations of method 300, the two pumps are positive displacement pumps and are coupled to a common drive shaft to rotate simultaneously. As an example, desalination assembly 100 may be used as the filtering assembly of method 300. As an example, the operation of method 300 may involve water production system 50. In some instances, the method may include selecting the discharge zone to be a zone that is in fluid communication with a hydrocarbon production zone of a second wellbore.

Figure 4:
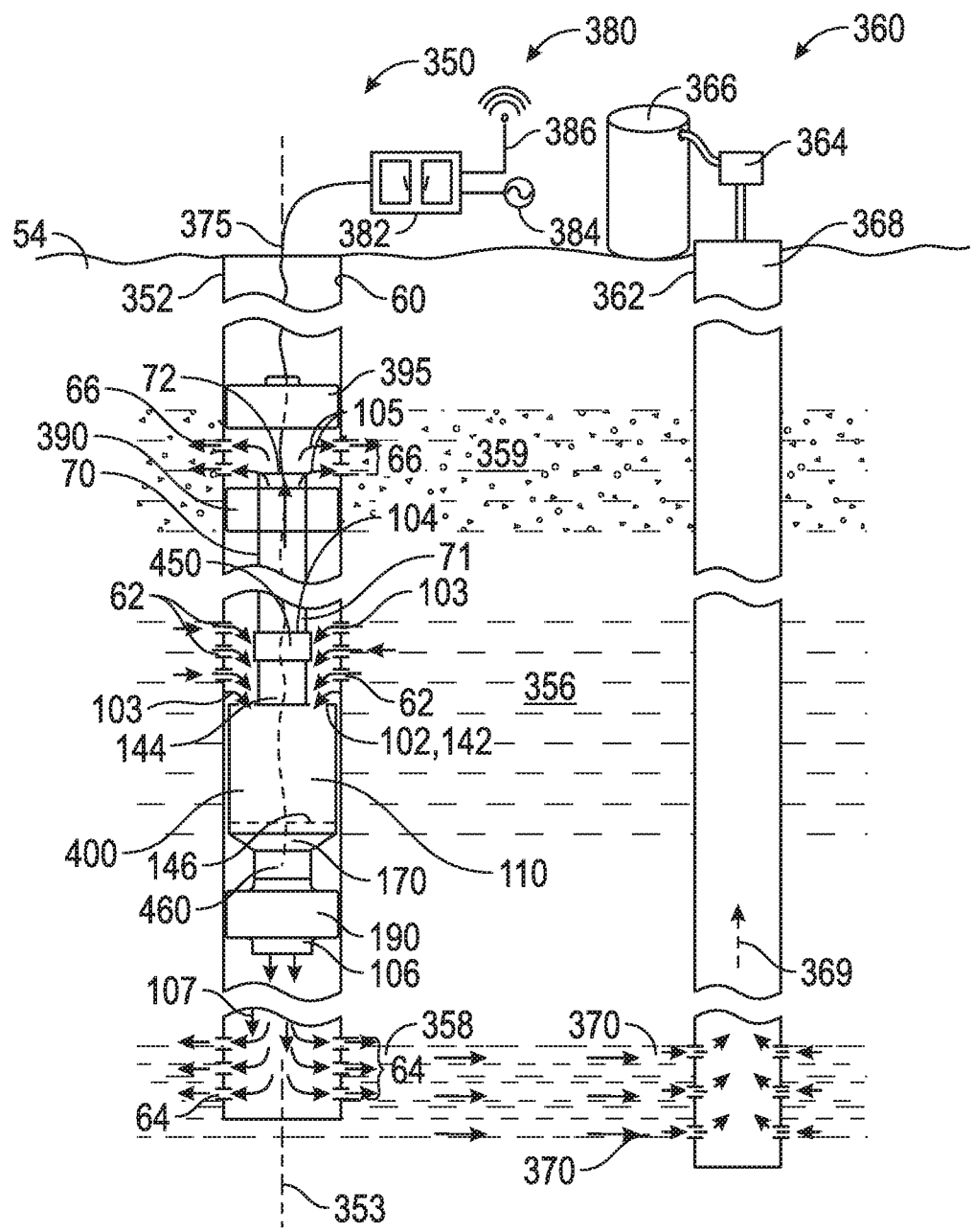
FIG. 4 is a front view in partial cross-section of another embodiment of a fluid production system disposed in a wellbore. The system is capable of reducing the saline content of water and capable of providing enhanced oil recovery for a nearby producing well in accordance with principles described herein.

Referring now to FIG. 4, a fluid production system 350 that removes unwanted constituents from a fluid feed stream is shown positioned in a first borehole or wellbore 352 extending from the surface of earth 54 through a fluid supply zone 356, which may be a source of water, and down to or through a discharge zone 358. Fluid production system 350 also participates in enhanced oil recovery by proximity to a hydrocarbon production well 360 having a production wellbore 362 that extends into a hydrocarbon production zone 370 that is in fluid communication with fluid discharge zone 358. In at least some instances, hydrocarbon production zone 370 is an extension of discharge zone 358.

Wellbore 352 also extends through another permeable zone 359, which is suitable for use as a storage zone for permeate, i.e. cleaner, processed water. Fluid production system 350 is configured to and capable of removing or at least reducing the mineral content, e.g. salinity, of feed water 103 received from supply zone 356. Thus, fluid production system 350 may also be called water production system 350. Wellbore 352 includes a longitudinal axis 353 generally aligned with the center of wellbore 353 through the length of wellbore 353. Though shown as vertical, in general, wellbore 352 and wellbore axis 353 may have various portions that are generally vertical, generally horizontal, or slanted and may have curved portions between those various portions. In FIG. 4, discharge zone 358 is located at a lower elevation than supply zone 356, and storage zone 359 is located at a higher elevation than both of the other zones 356, 358.

A tubular casing 60, which may be a metal pipe for example, is positioned and cemented in wellbore 352. Casing 60 has a first set of perforations 62 at a location corresponding to supply zone 356, a second set of perforations 64 at a location corresponding to discharge zone 358, and third set of perforations 66 at a location corresponding to storage zone 359. Perforations 62, 64, 66 provide fluid communication between the central channel of casing 60 and zones 356, 358, 359 respectively.

Continuing to reference FIG. 4, in addition to the second wellbore 362, hydrocarbon production well 360 includes a pumping unit 364, a storage tank 366, and a casing 368 extending through wellbore 362 to isolate zones between the production zone 370 and the surface of the earth. Wellbore 362 may extend through zones 356, 359, depending on the horizontal extent of these zones. Well 360 is configured for the extraction of a production fluid 369 from zone 358. For example, casing 368 is perforated in production zone 370. The production fluid 369 may contain hydrocarbons mixed with water and other substances.

Like water production system 50, water production system 350 includes a filtering assembly, which in this embodiment is a desalting or desalination assembly 400 positioned within wellbore 352 at a selected depth below the earth's surface, and system 350 includes a production tubing 70 extending upward from desalination assembly 400 within the wellbore. Desalination assembly 400 includes a filter 110, two positive displacement pumps 450, 460 closely-coupled to outlets at either end of filter 110, and a packing member 190 disposed within wellbore casing 60 between fluid zones 356, 358. Packing member 190 separates and seals two fluid zones within wellbore 352 or casing 60, separating fluid supply zone 356 and perforations 62 from fluid communication with discharge zone 358 and perforations 64. Packing member 190 also stabilizes the position of unit 400. In an embodiment, membrane filter 110 is as a reverse osmosis (RO) filter as previously described. Desalination assembly 400 further includes three fluid ports: an annular feed water inlet 102 located towards the upper end of unit 400, a processed water outlet or permeate outlet 104 located at the upper end of assembly 100 corresponding to the discharge of the pump 450, and a concentrated fluid outlet 106 located at the lower end of unit 400, adjacent packing member 190. As in water production system 50 so also in system 350, the feed water inlet 102 corresponds to the inlet screen 142 of filter 110. Some embodiments of desalination assembly 400 include additional one or more different filters or filtration elements fluidically coupled in series with filter 110.

Pump 450, the upper of the two pumps, is the permeate pump, having its suction port closely-coupled to the permeate outlet 144 at the upper end of filter 110 for fluid communication and its discharge port closely-coupled to the lower end 71 of production tubing 70 for fluid communication. In the embodiment, pump 450 attaches directly to filter 110 and directly to production tubing 70, with these two couplings each enhanced by a sealing member (not shown). Pump 460, the lower of the two pumps is the concentrated fluid pump, having its suction port closely-coupled to the concentrated fluid outlet 146 at the lower end of filter 110 for fluid communication. In the embodiment, pump 460 may be said to be attached to filter 110 with the attachment possibly including a discharge coupler 170 and possibly a sealing member, for example.

Each pump 450, 460 includes a submersible electrical motor coupled to a suitable pump mechanism, such as, for example, a progressive cavity with a rotor and stator similar to pumps 150, 160 or a piston-cylinder combination for reciprocation. In FIG. 4, the rotational speed of at least pump 450 or pump 460 is variable by the configuration of pump 450, 460 or by the configuration of a motor controller. The permeate pump 450 is configured to pull the purified permeate stream 105 from the processed water port 144 at the upper end of filter 110 and push it vertically upward with respect to wellbore axis 353, through a perforations 66 and into storage zone 359. The suction port of the concentrated fluid pump 460 is coupled to the concentrated fluid outlet 146 at the lower end of filter 110 and is configured to draw a concentrated fluid stream 107 from filter 110 and discharge it vertically downward with respect to wellbore axis 353, through concentrated fluid outlet 106 and into discharge zone 358.

As positive displacement pumps, each pump 450, 460 has a prescribed discharge-volume-per-cycle characteristic. Therefore pumps 450, 460 are configured to have a constant pumping ratio relative to one another when they each operate at a constant speed. However, because pumps 450, 460 are electrically driven and configured for variable, independently controllable speeds, during operation, the pumping ratio of the two pumps may be adjusted by a motor controller. The pumping ratio may be dynamically adjusted, or the pumping ratio may be set to a selected value, being held constant for a selectable period of time or set of circumstances and may later be adjusted. Some other embodiments use positive displacement pumps 450, 460 configured only for constant speed, resulting in a fixed pumping ratio. When a constant or fixed pumping ratio is used, the ratio of the permeate stream 105 flow rate to the concentrated fluid stream 107 flow rate is steady. In some embodiments, pump 450 may be a different type or configuration of pump than is pump 460.

Water production system 350 also includes a second packing member 390 disposed in casing 60 between zones 356, 359, a third packing member 395 disposed in casing 60 above zone 359, and an electrical cable 375 extending upward from pumps 450, 460, through packing members 390, 395 to surface equipment 380. The third packing member 395 is axially closer to the upper end of borehole 352 than is second packing member 390. Packing members 390, 395 seal the third set of perforations 66 and thus storage zone 359 from fluid communication with other sections of casing 60, including the second set of perforations 64 that fluidically communicate with supply zone 356. Production tubing 70 extends through second packing member 390, having its external surface sealed by packing member 390. Production tubing 70 terminates between packing members 390, 395, forming a subterranean permeate discharge port 72 at the upper end of tubing 70 in fluid communication with the third set of perforations 66 and storage zone 359. Alternately, production tubing 70 may couple to and terminate at the lower end of packing member 390, and the upper end of packing member 390 forms the subterranean permeate discharge port 72. For either embodiment, packing member 390 seals between the production tubing 70 and casing 60 or the wellbore 52, locally preventing the axial flow of fluid through the annular space between production tubing 70 and casing 60. The distance between the lower end 71 of production tubing 70 and the permeate discharge port is less than a selected depth for filtering assembly 400. The third set of perforations 66 may also be called a subterranean permeate discharge port for water production system 350. The permeate discharge port 72 and perforations 66 are in fluid communication with permeate outlet 104 of desalination assembly 400 and together form a path for delivering processed water, i.e. a permeate stream 105, to storage zone 359.

The second packing member 390 stabilizes or holds the position of production tubing 70 and desalination assembly 400 within casing 60 and wellbore 352. The third packing member 395 seals casing 60 and therefore well bore 52, packing member 395 being configured to prevent fluid communication between the portion of casing 60 above member 395 and the portion of casing 60 below member 395. Packing member 395 sealingly receives electrical cable 375 and may stabilize the position of electrical cable 375. Any of the components of water production system 350, such as packing members 390, 395, casing 60, and desalination assembly 400 with packing member 190 may be installed, secured, or removed from wellbore 352 by any manner known in the art.

Referring still to FIG. 4, surface equipment 380 includes an electrical panel box 382 electrically coupled to a power source 384. Power source 384 may be a connection to power lines or an on-site electrical generator of any type, including a diesel generator, a solar energy system, a natural gas-fired turbine, or a fuel cell for example. Panel box 382 may include, for example, a motor controller module, data acquisition modules, operational analysis modules, memory modules, communications modules, diagnostics modules, or other modules and equipment for various functionalities. In various embodiments, a variable frequency drive (VFD) may be utilized as the motor controller for the motor of pumps 450 or for the motor of pump 460. In an embodiment, panel box 382 includes an antenna 386 for wireless communication with external communication systems, including computer networks or mobile electronic devices, for example. Electrical cable 375 electrically couples panel box 382 and the drive motors of pumps 450, 460 for transmission of electrical power and data. In various embodiments, electrical cable 375 includes additional conductors for data and power communication with various sensors that may be coupled to other components of desalination assembly 400, such pressure sensors configured to indicate when filter 110 is fouling or any of the others sensors mentioned herein.

During operation of production system 350, feed water 103 from supply zone 356 enters wellbore casing 60 through the perforations 62 and is drawn into filter 110 by the action of pumps 450, 460, in some situations aided by hydrostatic or pore pressure. A first portion of the feed water 103 passes through the internal walls of the RO membrane filter 110, leaving behind at least some salts or other constituents and becoming the permeate or processed water stream 105, which is drawn into pump 450 and is sent through subterranean permeate discharge ports 72, 66 into storage zone 359. The power usage by pump 450 may be monitored by operational modules in panel box 382 and may be used to estimate the flow of permeate stream 105 into storage zone 359. Based on the known or measured geological characteristics of storage zone 359, the speed of pump 450 or pump 460 may be the modulated, i.e. adjusted, to achieve a flow rate of stream 105 appropriate for storage zone 359. This control of pumps 450, 460 may be achieved by a module in panel box 382. In some embodiments may include flow sensors and pressure sensors, for example, to monitor and govern the flow of permeate stream 105 into storage zone 359.

A second portion of the feed water 103 continues, following a second path to exit filter 110, carrying along the salts or other constituents remaining from the now-separated permeate stream 105 and becoming the concentrated fluid stream or reject stream 107. The concentrated fluid stream 107 is drawn into lower pump 460 and discharged through fluid outlet 106, travelling through perforations 64, and into discharge zone 358 within the earth. The flow of reject stream 107 increases the pore pressure of discharge zone 358 around wellbore 352 causing a net flow of fluid away from wellbore 352 and increasing the flow of production fluid 369 from production zone 370 into wellbore 362 and ultimately into tank 366 of production well 360, at least in some circumstances. The increased flow of production fluid 369 is the enhanced oil recovery effect.

Desalination assembly 400 of water production system 50 is driven by electrical energy supplied by electrical cable 375. In a simple embodiment, desalination assembly 400 does not purposefully communicate other information signals with surface equipment 80. Some other embodiments of unit 400 include instrumentation or control equipment that exchange power or data signals with surface equipment 80, as previously described for water production system 100.

Additional embodiments and possible operational conditions of a fluid production system or a filtering assembly consistent with the present disclosure will be considered here.

Referring again to FIG. 1, if the water in supply zone 56 or if a fluid (e.g. the feed water 103) in wellbore 52 or casing 60 extends above the permeate outlet 104 of assembly 100, the resulting hydrostatic head pressure may help drive the feed water 103 through desalination assembly 100, assisting the production of permeate stream 105. In some embodiments or for some operational conditions, a fluid pressure differential between the supply zone 56 and the discharge zone 58 may help drive the feed water 103 through desalination assembly 100, reducing or eliminating the use of the energy by motor 82 for pumps 150, 160. For example, the pressure differential may be due to pore pressure of fluid in supply zone 56. In FIG. 1, the elevation difference between zones 56, 58 develops a pressure differential due to hydrostatic head pressure. In addition, the concentrated fluid stream 107 will have a higher density than the feed water 103 from zone 56 during normal operation, and in some situations, the concentrated fluid stream 107 will have a higher density than the ground water that may occupy the discharge zone 58, either situation further encouraging the downward movement of stream 107. In some embodiments, the concentrated fluid pump 160 is configured to be driven by the pressure differential between earthen zones 56, 58 that fluidically communicate with the wellbore 52, and fluid pump 160 may recover potential energy as a result. When available, the recovered energy may, for example, drive or help to drive the permeate pump 150. Similarly, some embodiments or some operational conditions of fluid production system 350 of FIG. 4 may produce a similar benefit due to a pressure differential between supply zone 356 and filter outlet 104 or between zones 356, 358. In some embodiments, a pump 460 is configured to be driven by the pressure differential in the wellbore 325, acting like an electrical generator, reducing or eliminating the net use of the energy from power supply 384, and in some instances the energy recovered by pump 460 may drive the permeate pump 450.

In some embodiments, a gearbox is coupled between interconnecting shaft 180 and pumps 150, 160, and the gear box establishes a differential speed ratio for the pumps or causes one pump to rotate in the opposite direction of the other pump. In embodiments wherein the two pumps (e.g. pumps 150, 160) are configured to rotate in opposite directions, the rotor and stator pairs of the pumps 150, 160 are again selected to achieve a constant, fixed pumping ratio relative to one another, as previously described. In such embodiments, the rotor and stator pairs of both pumps may be either right-handed pairs or both left-handed pairs.

Referring still to FIG. 1, some embodiments may include another type of filter in addition to the RO filter 110 to achieve multi-stage filtration. For example, a pre-treatment filter capable of removing solid particles may be fluidically coupled in the flow path prior to the RO filter 110. To achieve another desired filtering effect, some other embodiments include another type of filter as the filter 110 and do not include an RO filter. Other types of filters or filtration technologies include, for example, a micro-filtration treatment module, a nano-filtration treatment module, a candlestick filter, and a simple fiber filter. The function or definition of some of these categories may over-lap. Some embodiments include a filter configured to produce a softened or cleaned brine product, a water-based fluid having less contamination, including a lower or a selected salt concentration. Using a softened brine product in drilling mud is advantageous when drilling through various formations or at least formations having clay. Whereas fresh water in drilling mud can cause the clay to swell and grip the drill pipe or drill bit, a properly selected softened brine product does not cause clay to swell, at least in some instances. Using a nano-filtration treatment module without an RO filter is an example of filtering technology that may be incorporated within a filtering assembly for a water production system 50 to produce a softened brine product. The resulting filtering assembly may have a configuration similar to desalination assembly 100, except the replacement of the RO filter with the nano-filtration treatment module.

Depending on the type of pumps chosen, in some embodiments, a check valve is positioned in series with production tubing 70 to prevent backflow of processed water through a desalination assembly 100, 400 when the two pumps are not operating. Referring to FIG. 2, in some embodiments, interconnecting shaft 180 of desalination assembly 100 passes through end cap 128 of filter 110 and passes through rotary seal 178, being sealed by rotary seal 178, and extends to rotor 164 of concentrated fluid pump 160, without the inclusion of a separate coupler shaft 176 in discharge coupler 170.

Although, the disclosure has primarily described the purification of feed water taken from a zone within the earth, other fluid sources may be used with various embodiments. Other potential feed-fluids or feed streams for the process include, for example, ground water (i.e. water located above the surface of the earth) or a process waste stream from an industrial process. Although, the disclosure has primarily described a saline component as a contaminant in the feed stream, other potential contaminants that may be removed include various organic as well as various inorganic compounds. For various embodiments, examples of removable contaminants include alcohol and sugar.

In some embodiments, a filtering assembly, e.g. desalination assembly 100, is positioned above-ground and is configured to receive a process waste stream, to produce a permeate stream 105 having water with improved purity, and to pump a concentrated fluid stream into a disposal well. In some embodiments, the concentrated fluid stream may be a desirable product, and this product that may be, for example, feed to a process configured to recover a salt slurry or solid salt.

Based on the teachings herein, it will be possible to combine one or more features of one described embodiment with one or more features of another described embodiment to form yet an additional embodiment of a fluid production system. For example, the recovery of cleaned fluid stream 105 to an above ground location, as is shown in FIG. 1 for fluid production system 50, may be implemented by an embodiment having the desalination assembly 400. As another example, referring to FIG. 4, although fluid production system 350 was described as having desalination assembly 400 having electrically driven pumps 450, 460 coupled to surface equipment 380 by electrical cable 375, some embodiments that store water in a subterranean reservoir 359 or provide enhanced oil recovery for a nearby producing well 362 include a shaft-driven desalination assembly 100 coupled to an above-ground motor 82. Some embodiments store water in a subterranean reservoir 359 without participating in enhanced oil recovery.

Referring to features of FIG. 1 and FIG. 4, in some embodiments, a fluid production system includes an extension shaft 75, as exemplified in FIG. 1, extending from a permeate pump 150 to a source of rotational power disposed adjacent the surface of the earth. The source of rotational power includes, for example, a motor 82 coupled to the extension shaft and a motor controller electrically coupled to motor 82. Similar to FIG. 4, the fluid production system further includes a concentrated fluid pump 460 that includes a submersible electrical motor electrically coupled to a separate motor controller or to another module in the first motor controller.

In some embodiments, one or both pumps 150, 160 is not a positive displacement pump. In some embodiments, one or both pumps 450, 460 is not a positive displacement pump. For example, a pump 150, 160, 450, 460 may be a vertical turbine pump rather than a positive displacement pump. When a pump 150, 160 is not a positive displacement pump, the pumping ratio between pumps 450, 460, which have a common rotational speed, may vary based on pressure and flow conditions at various locations in and around the wellbore. The pumping ratio between pumps 450, 460, for example, may be dynamically maintained by a motor controller coupled to flow meters that monitor the discharge of each pump. The pumping ratio between pumps 450, 460 may be constant or may be adjusted based on target parameters or operational conditions. After an adjustment, a new constant pumping ratio may be maintained for a period of time or indefinitely. As with any embodiment, the pumping ratio may be adjusted for the purpose of reducing the possibility of solid deposits, scale building-up on the filter membrane or may be adjusted in the opposite direction to increase the recovery ratio if the possibility of such scale build-up is thought to be less likely.

As presented in FIG. 2 and FIG. 4, desalination assemblies 100, 400 have no pressure control device, such as a back-pressure regulator, an adjustable valve, or an orifice coupled to a concentrated fluid outlet 106, 146 to govern flow rate of the concentrated fluid stream 107, which influences the recovery ratio, i.e. the ratio of the flow rate of permeate stream 105 to the flow rate of feed water 103. Instead, the concentrated fluid pump 160, 460, respectively, governs the flow rate of the concentrated fluid stream 107 that passes through the concentrated fluid outlets 106, 146. Therefore, the concentrated fluid pump influences or modulates the recovery ratio of filter 110 and the desalination assembly 100, 400. Stated more completely, the pumping ratio between concentrated fluid pump 160 and permeate pump 150 or between concentrated fluid pump 460 and permeate pump 450 modulates or governs, at least in part, the recovery ratio of filter 110. Some other embodiments include a pressure control device fluidically coupled (i.e. coupled for fluid communication) to a concentrated fluid outlet 146, 106 to modulate or to govern, at least in part, the recovery ratio.

In some embodiments, a water production system similar to water production system 350 is configured to discharge selectively the permeate stream 105 into storage zone 359 or to deliver selectively permeate stream 105 to another location, such as above the surface of the earth. Such an embodiment may include an extension of production tubing 70 through the third packing member 395 with tubing 70 having a permeate first discharge port 72 between packing members 395, 390, as in FIG. 4, and a permeate second discharge port 72 above surface, as in FIG. 1. A valve coupled to tubing 70 selectively allows permeate stream 105 to pass through the first or through the second discharge port 72 or allow a portion of permeate stream 105 to pass through each of the first and the second discharge ports 72.

As shown for water production system 350 in FIG. 4, so also for some embodiments of water production system 50, the production tubing 70 has distance between the lower end 71 and the permeate discharge port 72 that is less than a selected depth for the filtering assembly 100, configuring the tubing permeate discharge port 72 to be subterranean when the system is installed in a wellbore at the selected depth.

Although FIG. 1 shows discharge zone 58 located at a lower elevation than supply zone 56 for system 100, in some other implementations or embodiments discharge zone 58 may be at a higher elevation than supply zone 56. In various other implementations or embodiments of system 350, the relative elevations of zones 356, 358, 359 may be different that shown in FIG. 4.

While exemplary embodiments have been shown and described, modifications thereof can be made by one of ordinary skill in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. The inclusion of any particular method step or operation within the written description or a figure does not necessarily indicate that the particular step or operation is necessary to the method. Unless expressly stated otherwise, the steps or operations listed in a description of a method or in a method claim may be performed in any order, and in some implementations two or more of the method steps or operations may be performed in parallel, rather than serially.

What is claimed is:

1. A fluid production system for downhole fluid purification, comprising:
a filtering assembly configured to be disposed within a wellbore and having:
a filter comprising a fluid inlet, a permeate outlet, a concentrated fluid outlet and an inner tubing extending in the direction of the longitudinal axis of the filter, wherein the inner tubing comprises a permeable wall portion; and
a first pump comprising a suction port and a discharge port, wherein the suction port of the first pump is closely-coupled in fluid communication to the permeate outlet of the filter;
a second pump comprising a suction port and discharge port, wherein the suction port of the second pump is closely-coupled in fluid communication to the concentrated fluid outlet of the filter; and
an extension shaft extending from the first pump to a source of rotational power disposed adjacent the surface of the earth and configured to simultaneously rotate the first pump and the second pump to move fluid from the fluid inlet of the filter to the permeate outlet of the filter with the first pump and move fluid from the inlet of the filter to the concentrated fluid outlet of the filter with the second pump.

2. The fluid production system of claim 1, wherein the filter includes a reverse osmosis membrane.

3. The fluid production system of claim 1, wherein the source of rotational power for the first pump and the second pump comprises a first motor coupled to the extension shaft and electrically coupled to a first motor controller.

4. The fluid production system of claim 3, wherein the first and second pumps are configured to have a constant pumping ratio.

5. The fluid production system of claim 1, wherein the first and second pumps are configured to have a constant pumping ratio.

6. The fluid production system of claim 5, wherein the first pump and the second pump are coupled together by an interconnecting shaft, configuring the two pumps to operate at a same rotational speed.

7. The fluid production system of claim 1, further comprising:
a production tubing having a first end and a tubing permeate discharge port displaced from the first end;
wherein the first end is configured to couple to the discharge port of the first pump of the filtering assembly for fluid communication; and
wherein the distance between the first end and the tubing permeate discharge port is less than a selected depth for the filtering assembly, thus configuring the tubing permeate discharge port to be subterranean.

8. A method for reducing the amount of dissolved constituents contained in a fluid, comprising:
having a filtering assembly disposed in a first wellbore, wherein the filtering assembly comprises a membrane filter, a first pump closely-coupled to a first port of the membrane filter, a second pump closely-coupled to a concentrated fluid outlet of the membrane filter, and an inner tubing extending in the direction of the longitudinal axis of the membrane filter, wherein the inner tubing comprises a permeable wall portion;
operating the first pump to move a first portion of a fluid from a fluid supply zone of the earth through the membrane filter of the filtering assembly to remove unwanted constituents, producing a purified permeate stream;
operating the second pump simultaneously with the first pump to move a second portion of the fluid from the fluid supply zone of the earth through the filtering assembly, producing a concentrated fluid stream and achieving a constant ratio between the flow rate of the permeate stream and the concentrated fluid stream; and
disposing of the concentrated fluid stream in a selected discharge zone within the earth.

9. The method of claim 8, further comprising:
coupling the first pump to the second pump; and
maintaining the constant ratio between the flow rate of the permeate stream and the flow rate of the concentrated fluid stream during operation of each of the first pump and second pump.

10. The method of claim 8, further comprising:
selecting the discharge zone to be a zone that is in fluid communication with a hydrocarbon production zone of a second wellbore.

11. The method of claim 8, further comprising:
delivering at least a portion of the permeate stream to a selected permeable storage zone in the earth.

12. A fluid production system to desalinate water from a subterranean source, comprising:
a filtering assembly configured for installation within a first wellbore, the filtering assembly comprising:
a membrane filter comprising a fluid inlet, a permeate outlet, and a concentrated fluid outlet;
a first pump having a discharge port and a suction port, the suction port coupled to the permeate outlet for fluid communication; and
a second pump having a discharge port and a suction port, the suction port coupled to the concentrated fluid outlet for fluid communication; and
an inner tubing extending in the direction of the longitudinal axis of the membrane filter, wherein the inner tubing comprises a permeable wall portion;
wherein the first pump and the second pump are configured to simultaneously operate to move fluid from the fluid inlet of the membrane filter to the permeate outlet of the membrane filter with the first pump and move fluid from the inlet of the membrane filter to the concentrated fluid outlet of the membrane filter with the second pump.

13. The fluid production system of claim 12, further comprising:
an extension shaft extending from the first pump toward the surface of the earth;
a first motor disposed adjacent the surface of the earth and coupled to the extension shaft; and
a first motor controller electrically coupled to the first motor;
wherein the second pump includes a submersible electrical motor electrically coupled to a second motor controller.

14. The fluid production system of claim 12, wherein the first and second pumps are positive displacement pumps, the filtering assembly further comprising:
an interconnecting shaft coupling together the two pumps, configuring the two pumps to operate at a same rotational speed and to achieve a constant pumping ratio.

15. The fluid production system of claim 12, further comprising:
a motor coupled to at least one of the two pumps; and
a motor controller electrically coupled to the motor;
wherein the motor controller is configured to achieve a constant pumping ratio for the first and second pumps.

16. The fluid production system of claim 12, further comprising:
a production tubing having a first end and a tubing permeate discharge port displaced from the first end;
wherein the first end is configured to couple the discharge port of the first pump for fluid communication therebetween;
a first packing member coupled to the membrane filter and having a flow passage in fluid communication with the second pump and the concentrated fluid outlet of the filter;
a second packing member configured to seal between the production tubing and the first wellbore; and
a third packing member displaced from the second packing member and configured to seal the first wellbore;
wherein the second packing member is disposed between the first and third packing members; and
wherein the tubing permeate discharge port is disposed between the second packing member and the third packing member, thus configuring the tubing permeate discharge port to be subterranean.

17. The fluid production system of claim 12, wherein the first wellbore extends into each of a permeable fluid supply zone in the earth and a permeable fluid discharge zone in the earth axially displaced from the supply zone;
wherein the first wellbore comprises a production tubing coupled for fluid communication with the discharge port of the first pump and extending axially toward the surface of the earth and a packing member coupled to the membrane filter and sealingly disposed in the wellbore between the fluid supply zone and the fluid discharge zone;
wherein the filtering assembly is disposed within the first wellbore;
wherein the fluid inlet of the filter is in fluid communication with the fluid supply zone;
wherein the concentrated fluid outlet of the filter is in fluid communication with the fluid discharge zone.

18. The fluid production system of claim 17, wherein the first wellbore also extends into a third permeable zone suitable for storing a fluid from the permeate outlet, and wherein the production tubing includes a tubing permeate discharge port in fluid communication with the third permeable zone.

19. The fluid production system of claim 17, further comprising:
a second, production wellbore extending to a hydrocarbon production zone within the earth;
wherein the production zone is in fluid communication with the fluid discharge zone.

* * * * *